UNITED STATES PATENT OFFICE.

CARL CANZLER AND RICHARD SAMESREUTHER, OF DÜREN, GERMANY, ASSIGNORS TO AUTOGENWERK SIRIUS, GESELLSCHAFT MIT BESCHRÄNKTER HAFTUNG, OF DUSSELDORF, GERMANY, A FIRM.

ALLOY FOR WELDING COPPER AND NICKEL.

1,103,482.  Specification of Letters Patent.  Patented July 14, 1914.

No Drawing. Application filed September 24, 1913. Serial No. 791,490.

*To all whom it may concern:*

Be it known that we, CARL CANZLER and RICHARD SAMESREUTHER, both subjects of the German Emperor, and residents of Düren, Rhineland, Germany, coppersmiths, have invented a new and Improved Alloy for Welding Copper and Nickel, of which the following is a specification.

Hitherto in welding copper phosphorus was generally employed as a reducing agent for preventing an oxidization of the copper. This phosphorus was applied to the welding either in form of phosphorous copper wire or of a phosphorous powder, which was strewn on the joint during the welding operation. The results obtained were, however, not satisfactory as regards the quality of the welded joint. With the object of obtaining better results, a copper wire has in recent times been used, which contained, beside the phosphorus, also tin and zinc at varying percentages. But neither by such means an absolutely perfect welded joint was obtainable, on the contrary, the joint is generally brittle and does therefore not allow of being conveniently worked.

According to the present invention a copper wire shall be used for such welding operations, which contains besides the amount of phosphorus necessary for the welding operation, also silver in quantities up to five per cent. In place of the silver, cadmium, bismuth, or an alloy of any or all of these metals may be employed, the cadmium, silver and alloys, being an equivalent of the silver for the purposes of this invention. The joints welded with such a binding agent or alloy of copper and silver show an extraordinary strength and elasticity. The welded joints may be worked in a heated condition. The alloy may be also employed in the same manner for welding nickel, which is an equivalent of copper, for the purposes of this invention.

We claim:

1. An alloy for welding copper which consists of the same metal as a base, phosphorus and a small percentage of silver.

2. An alloy for welding copper, which consists of an alloy made in the form of a wire and consisting of the same metal as a base, phosphorus and a small percentage of silver.

In testimony whereof, we hereto affix our signatures in the presence of two subscribing witnesses.

CARL CANZLER.
RICHARD SAMESREUTHER.

Witnesses:
 LOUIS VANBORY,
 OSCAR DEPNER.